United States Patent [19]

Ajioka et al.

[11] Patent Number: 5,556,711
[45] Date of Patent: Sep. 17, 1996

[54] DECOMPOSABLE COMPOSITE MATERIAL

[75] Inventors: Masanobu Ajioka, Kanagawa-Ken; Katashi Enomoto, Fukuoka-Ken; Akihiro Yamaguchi; Kazuhiko Suzuki, both of Kanagawa-Ken, all of Japan

[73] Assignee: Mitsui Toatsu Chemicals, Inc., Tokyo, Japan

[21] Appl. No.: 380,311

[22] Filed: Jan. 30, 1995

Related U.S. Application Data

[63] Continuation of Ser. No. 78,847, Jun. 21, 1993, abandoned.

[30] Foreign Application Priority Data

Jun. 29, 1992 [JP] Japan ..................... 4-170806

[51] Int. Cl.⁶ ..................... B32B 15/08; B32B 27/42
[52] U.S. Cl. ..................... 428/460; 428/457; 428/35.8
[58] Field of Search ..................... 428/457, 460, 428/35.8; 524/315, 317

[56] References Cited

U.S. PATENT DOCUMENTS

| | | | |
|---|---|---|---|
| 3,930,109 | 12/1975 | Brandt et al. | 428/422 |
| 4,014,433 | 3/1977 | Cerwin | 206/63.3 |
| 4,057,537 | 11/1973 | Sinclair | 260/78.3 R |
| 5,180,765 | 1/1993 | Sinclair | 524/306 |

FOREIGN PATENT DOCUMENTS

| | | |
|---|---|---|
| 514137 | 11/1992 | European Pat. Off. . |
| 4-335060 | 11/1992 | Japan . |
| 1397570 | 6/1975 | United Kingdom . |
| WO90/01521 | 2/1990 | WIPO . |

OTHER PUBLICATIONS

Database WPI 9249, Derwent Publications Ltd., JPA-4 298336.

*Primary Examiner*—Paul Thibodeau
*Assistant Examiner*—Stephen Sand
*Attorney, Agent, or Firm*—Burns, Doane, Swecker & Mathis

[57] ABSTRACT

A multilayer composite consisting of aluminum and a resin composition primarily comprising a lactic acid base polymer, is disclosed. The composite material is excellent in mechanical and gas barrier properties and has characteristic of totally decomposing under alkaline conditions.

5 Claims, No Drawings

DECOMPOSABLE COMPOSITE MATERIAL

This application is a continuation of Application Ser. No. 08/078,847, filed Jun. 21, 1993, now abandoned.

BACKGROUND OF THE INVENTION AND RELATED ART

1. Field of the Invention

The present invention relates to a decomposable composite material, and more particularly, relates to a readily decomposable composite material having excellent gas-barrier properties and consisting of aluminum and a thermoplastic polymer which primarily comprises a lactic acid polymer.

2. Related Art of the Invention

For packaging material, polyethylene, polyethylene terephthalate, polyvinyl chloride, polypropylene, paper, aluminum and composite materials of these materials have conventionally been used. Although some of these packaging materials prepared from these plastics are excellent in gas-barrier properties, these materials have a very slow rate of degradation and thus remain semipermanently when discarded as refuse and buried under the ground. Disposal of these plastics in the ocean causes aesthetic damage of a view or destruction of the living environment of marine organisms.

Paper is degradable in the natural environment while lacking in gas-barrier properties and thus suffers from the disadvantage that the packed contents cannot be stored for a long period. On the other hand, aluminum foil has high gas-barrier properties and low mechanical strength and thus suffers the defect that a package is easily broken in the course of transport and the contents cannot be protected.

On the other hand, polylactic acids and a copolymer of lactic acid and other hydroxycarboxylic acids than lactic acid (generic name of the polylactic acid and the copolymer will hereinafter be referred to simply as a lactic acid base polymer) have been known as thermoplastic polymers having degradability. These polymers can be completely biodegraded within a few months to an year in an animal body. When the polymers are placed in soil or sea water, they start to decompose within a few weeks in a moist environment and totally decompose within several years. Further, final degradation products of these polymers are lactic acid, carbon dioxide and water which are nontoxic to human body.

Polymers of lactic acid are usually prepared from a cyclic dimer of lactic acid which is called lactide, and U.S. Pat. Nos. 1,995,970, 2,362,511, and 2,683,136 have disclosed a polymerization process of lactide. U.S. Pat. Nos. 3,636,956 and 3,797,499 have disclosed a process for copolymerizing lactic acid and glycolic acid. In the copolymerization of lactic acid and other hydroxy carboxylic acid copolymer, lactide and a cyclic ester intermediate, for example glycolide, i.e., a dimer of glycolic acid, are used for polymerization.

The above lactic acid base polymer is degradable, but has relatively high gas permeability and leads to problems when the polymer is used in the fields where gas-barrier properties are required. Consequently, development of composite materials which can be decomposed with ease and are excellent in gas-barrier properties has been strongly desired.

SUMMARY OF THE INVENTION

An object of the invention is to provide a composite material which can be decomposed with ease and is excellent in gas-barrier properties.

In the course of an intensive research on the degradable polymers, the present inventors have focused attention on the above lactic acid base polymer and found that a composite material consisting of aluminum and a resin composition which primarily comprises a lactic acid base polymer is excellent in mechanical strength and gas barrier properties and can be totally decomposed by decomposing with ease in an alkaline condition. Thus the invention has been completed.

That is, the aspect of the invention is a decomposable composite material consisting of aluminum and a thermoplastic polymer that primarily comprises lactic acid base polymer.

DETAILED DESCRIPTION OF PREFERRED EMBODIMENTS

The lactic acid base polymer used for the invention is polylactic acid or a copolymer of lactic acid and hydroxycarboxylic acids other than lactic acid. Hydroxycarboxylic acids which can be used include, for example, glycolic acid, 3-hydroxybutyric acid, 4-hydroxybutyric acid, 4-hydroxyvaleric acid, 5-hydroxyvaleric acid and 6-hydroxycaproic acid. The lactic acid used for a raw material of the present invention is L-lactic acid, D-lactic acid or a mixture thereof.

The lactic acid base polymer can be obtained by a direct dehydrating polycondensation process of lactic acid, a direct dehydrating copolycondensation process of lactic acid and the other hydroxycarboxylic acid than lactic acid or a ring-opening polymerization process of a cyclic dimer such as lactide, the cyclic dimer of lactic acid, glycolide (GLD), the cyclic dimer of glycolic acid, ε-caprolactone (CL), the cyclic ester of 6-hydroxycaproic acid and other monomers which are copolymerizable with these raw materials.

When the lactic acid base polymer is prepared by direct dehydration condensation, lactic acid or a mixture of lactic acid with other hydroxycarboxylic acid is subjected to azeotropic dehydration condensation preferably in the presence of an organic solvent, a phenyl ether based solvent in particular. The condensation is more preferably progressed by returning a substantially anhydrous solvent to the reaction system after removing water from an azeotropically distilled solvent. High molecular weight polylactic acid having sufficient strength for use in the invention can be obtained by such a method. The polymer thus obtained, a copolymer of L-lactic acid and D-lactic acid or a copolymer of lactic acid and glycolic acid in particular, differs in physical properties from the polymer obtained by usual ring-opening polymerization. A composite material prepared from the polymer thus-obtained also differs in properties for practical use such as heat sealability.

The thermoplastic polymer composition is prepared by adding conventional thermoplastic polymers, plasticizers and other various additives to the lactic acid base polymer. The known thermoplastic polymer preferably include degradable polymers such as polyglycolic acid and poly-ε-caprolactone. Preferred proportion of the lactic acid base polymer in the thermoplastic polymer composition depends upon the desired decomposability and is generally 50% or more. The thermoplastic polymer composition can be prepared by application of any known techniques and is used in the form of pellets, rods and powder.

The decomposable composite material consisting of aluminum and the thermoplastic polymer composition of the invention can be prepared by coating a thermoplastic polymer on an aluminum foil or a shaped form of aluminum or by vacuum depositing aluminum on a film or a molded form of the thermoplastic polymer. Coating methods include for example, a method for dissolving the thermoplastic resin in a solvent, coating the solution on an aluminum foil or shaped form and drying the coated aluminum; a method for melting the thermoplastic resin and coating the molten resin on aluminum; and a method for adhering a thermoplastic polymer film to an aluminum foil or shaped form by hot-pressing or with an adhesive. Exemplary adhesives which can be used include gelatin, starch paste and low molecular weight polylactic acid.

EXAMPLES

The present invention will hereinafter be illustrated in detail by way of examples and comparative examples.

In the examples and comparative examples, the weight average molecular weight of the polymer was measured by gel permeation chromatography under the following conditions using polystyrene as a reference.

Equipment: Shimadzu LC-10 AD
Detector: Shimadzu RID-6A
Column: Hitachi Kasei GL-S350DT-5, GL-S370DT-5
Solvent: Chloroform
Concentration: 1%
Amount of sample: 20 µl
Flow rate: 1.0 ml/min

Preparation Example 1

To a thick-walled cylindrical stainless steel polymerizer equipped with a stirrer, 216 g (1.5 mol) of L-lactide, 0.01% by weight of stannous octoate and 0.03% by weight of dodecyl alcohol were charged. The mixture was deaerated for 2 hours under a vacuum and heated in a nitrogen atmosphere with stirring at 200° C. for 3 hours. Then the polymerizer was gradually deaerated through a gas outlet tube and glass receiver with a vacuum pump to a reduced pressure of 3 mmHg while maintaining the same temperature. After reacting for an hour from the start of deaeration, distillation of monomer and low molecular weight volatiles ceased. The interior of the polymerizer was replaced by nitrogen. Poly-L-lactic acid obtained was discharged from the bottom of the polymerizer in the form of a strand and cut into pellets. The pelletized polymer had an average molecular weight of 100,000.

Preparation Example 2

Polylactic acid pellets were prepared by carrying out the same procedures as described in Preparation Example 1 except that 216 g of L-lactide was replaced by 172 g of L-lactide and 44 g of DL-lactide. The polymer obtained had an average molecular weight of 100,000.

Preparation Example 3

L-lactide-glycolide copolymer pellets were prepared by carrying out the same procedures as described in Preparation Example 1 except that 216 g of L-lactide was replaced by 108 g of L-lactide and 108 g of glycolide. The copolymer obtained had an average molecular weight of 100,000.

Preparation Example 4

L-lactide-ε-caprolactone copolymer pellets were prepared by carrying out the same procedures as described in Preparation Example 1 except that 216 g of L-lactide was replaced by 108 g of L-lactide and 108 g of ε-caprolactone. The copolymer obtained had an average molecular weight of 70,000.

Preparation Example 5

In a reaction vessel, 10.0 kg of 90% L-lactic acid was heated with stirring at 150° C. for 3 hours under reduced pressure of 50 mmHg while distilling out water. Thereafter 6.2 g of tin powder was added and further reacted with stirring at 150° C. for 2 hours under reduced pressure of 30 mmHg to obtain an oligomer. To the oligomer, 28.8 g tin powder and 21.1 kg of diphenyl ether were added, and an azeotropic dehydration reaction was carried out at 150° C. under reduced pressure of 35 mmHg. Distilled water was separated from the solvent in a water separator and the solvent alone was returned to the reaction vessel. After reacting for 2 hours, the return route for the solvent was changed to pass through a column packed with 4.6 kg of molecular sieve 3A before returning to the reaction vessel. Successively, the reaction was continued at 150° C. for 40 hours under reduced pressure of 35 mmHg to obtain a polylactic acid solution having an average molecular weight of 110,000. The solution obtained was mixed with 44 kg of dehydrated diphenyl ether and cooled to 40° C. Precipitated crystals were filtered, washed three times with 10 kg of n-hexane and dried at 60° C. under reduced pressure of 50 mmHg. The powder thus obtained was mixed with 12 kg of 0.5N hydrochloric acid and 12.0 kg of ethanol, stirred at 35° C. for an hour, filtered and dried at 60° C. under reduced pressure of 50 mmHg to obtain 6.1 kg of polylactic acid powder (85% yield). The powder was pelletized with a pelletizer and used for measuring properties. The polymer obtained had an average molecular weight of 110,000.

The polymers obtained in Preparation Examples 1–5 were individually dissolved in chloroform in a concentration of 10–20%, cast respectively on a glass plate and dried at 60° C. under reduced pressure. Films thus prepared had a thickness of 25–30 µm and were used in the following examples.

In any of the above examples and comparative examples, gas permeability and moisture permeability were measured by the following methods on each composite material obtained.

(1) $O_2$ and $CO_2$ Gas Permeability

In accordance with JIS K-7126 Method A (Pressure difference method) which is corresponds to ASTM D-1434.

(2) Moisture Permeability

In accordance with JIS K-0208 which is correspond to ASTM D—.

Results are illustrated in Table.

Example 1

A 30% aqueous gelatin solution was coated as an adhesive on an aluminum foil having dimensions of 150 mm in length, 150 mm in width and 7 µm in thickness. The coated surface was superimposed on a film which was obtained from the polymer of Preparation Example 1 and had thickness of 30 µm. The overlapped film was pressed overnight under pressure of 1 kg/cm². Adhesion between the aluminum foil and the polymer film was good. A composite film thus obtained had good surface gloss, high transparency in a resin layer and high strength.

The film thus obtained was immersed in an 1N aqueous sodium hydroxide solution at 60° C. for an hour. The film was completely dissolved in the solution.

Example 2

The same polylactic acid film as used in Example 1 was superimposed on an aluminum foil having dimensions of 150 mm×150 mm×7 μm and hot-pressed at 175° C. for 5 minutes under the pressure of 30 kg/cm². Adhesion between the aluminum foil and the polymer film was good. The composite film thus obtained had good surface gloss, high transparency of a resin layer and high strength.

Two composite films were lapped so as to bring the polymer side into contact with each other and hot-pressed at 105° C. for 0.5 second under the pressure of 0.5 kg/cm². These films, however, could not be adhered. Press temperature of 118° C. was required in order to adhere by pressing for 0.5 second under the pressure of 0.5 kg/cm².

The film thus obtained was immersed in an 1N aqueous sodium hydroxide solution at 60° C. for an hour. The film was completely dissolved in the solution.

Example 3

A composite film was prepared by the same procedures as described in Example 2 except that the film obtained from the polymer of Preparation Example 1 was replaced by the film which was obtained from the polymer of Preparation Example 2 and had a thickness of 25 μm. Adhesion between aluminum foil and the polymer film was good. The composite film obtained had good surface gloss, high transparency of a resin layer and high strength.

The film thus obtained was immersed in an 1N aqueous sodium hydroxide solution at 60° C. for an hour. The film was completely dissolved in the solution.

Example 4

A composite film was prepared by the same procedures as described in Example 2 except that the film obtained from the polymer of Preparation Example 1 was replaced by the film which was obtained from the polymer of Preparation Example 3 and had a thickness of 25 μm. Adhesion between the aluminum foil and the polymer film was good. The composite film obtained had good surface gloss, high transparency of a resin layer and high strength.

The film thus obtained was immersed in an 1N aqueous sodium hydroxide solution at 60° C. for an hour. The film was completely dissolved in the solution.

Example 5

A composite film was prepared by the same procedures as described in Example 2 except that the film obtained from the polymer of Preparation Example 1 was replaced by the film which was obtained from the polymer of Preparation Example 4 and had a thickness of 25 μm. Adhesion between aluminum foil and the polymer film was good. The composite film obtained had good surface gloss, high transparency of a resin layer and high strength.

The film thus obtained was immersed in an 1N aqueous sodium hydroxide solution at 60° C. for an hour. The film was completely dissolved in the solution.

Example 6

To an aluminum foil having dimensions of 150 mm×150 mm×7 μm, 20 g of a 15% chloroform solution containing the polymer prepared in Preparation Example 1 was applied and dried overnight at room temperature. The coated film was further dried at 50° C. under reduced pressure. The composite film thus obtained had good surface gloss, high transparency of a resin layer and high strength.

The film thus obtained was immersed in an 1N aqueous sodium hydroxide solution at 60° C. for an hour. The film was completely dissolved in the solution.

Example 7

A metallized film was prepared by vapor deposition of aluminum to a thickness of 500 Å on a film which was obtained from the polymer of Preparation Example 1 and had dimensions of 150 mm×150 mm×30 μm. The polymer surface of the film obtained had good gloss and the resin layer had high transparency.

The film obtained was buried in a soil having a moisture content of 30% and temperature of 35° C. After a month, the film strength was drastically decreased and the film shape was broken with ease by external force.

Example 8

A composite film was prepared by the same procedure as described in Example 2 except that the film obtained from the polymer of Preparation Example 1 was replaced by the film which was obtained from the polymer of Preparation Example 5 and had a thickness of 25 μm. Adhesion between aluminum foil and the polymer film was good. The composite film obtained had good surface gloss, high transparency of a resin layer and high strength.

Two composite films were lapped so as to bring the polymer side into contact with other and hot-pressed at a hot-plate temperature of 105° C. for 0.5 second under the pressure of 0.5 kg/cm². Good adhesion could be obtained.

The film thus obtained was immersed in an 1N aqueous sodium hydroxide solution at 60° C. for an hour. The film was completely dissolved in the solution.

Comparative Example 1

A film having a thickness of 30 μm was prepared from the polymer of Preparation Example 1.

The film had a very high permeability for gas and moisture.

Comparative Example 2

A composite film was prepared by the same procedures as described in Example 1 except that the polylactic acid film was replaced by a polypropylene film having a thickness of 30 μm. The polymer surface of the composite film had some haze.

The composite film was immersed in an 1N aqueous sodium hydroxide solution at 60° for an hour. The aluminum layer of the composite film was dissolved in the solution, but the polypropylene film maintained its shape.

Comparative Example 3

A metallized film was prepared by the same procedures as described in Example 7 except that the polylactic acid film was replaced by a polypropylene film of 30μ in thickness. The polymer surface of the metallized film had some haze.

The metallized film was submerged in an 1N aqueous sodium hydroxide solution at 60° C. for an hour. The aluminum layer of the metallized film was dissolved in the solution. However, the polypropylene film maintained its shape.

Comparative Example 4 composite film was prepared by the same procedures as described in Example 2 except that the polylactic acid film was replaced by a copolymer film which had an average molecular weight of 190,000, consisted of 3-hydroxybutyric acid and 3-hydroxyvaleric acid in a weight ratio of 75:25, and was 30 μm in thickness. The copolymer surface of the composite film had some haze.

The composite film was submerged in an 1N aqueous sodium hydroxide solution at 60° C. for an hour. The aluminum layer was dissolved in the solution. However, the copolymer layer maintained the shape.

TABLE

| | Gas permeability ($cm^3/m^2 \cdot 24\ hr \cdot atm$) | | Moisture permeability |
|---|---|---|---|
| | $O_2$ | $CO_2$ | ($g/m^2 \cdot 24\ hr$) |
| Example 1 | 0 | 0 | 0 |
| Example 2 | 0 | 0 | 0 |
| Example 3 | 0 | 0 | 0 |
| Example 4 | 0 | 0 | 0 |
| Example 5 | 0 | 0 | 0 |
| Example 6 | 0 | 0 | 0 |
| Example 7 | 35 | 110 | 14 |
| Example 8 | 0 | 0 | 0 |
| Comp. Ex. 1 | 380 | 1200 | 150 |
| Comp. Ex. 2 | 0 | 0 | 0 |
| Comp. Ex. 3 | 180 | 530 | 2 |
| Comp. Ex. 4 | 0 | 0 | 0 |

In the Table Comp. Ex. means Comparative Example.

The present invention may be practiced or embodied in still other ways without departing from the spirit or essential character thereof.

The foregoing examples are not intended to limit the scope of the present invention. This may be practiced or embodied in still other ways without departing from the spirit or essential character thereof.

We claim:

1. A multilayer composite completely decomposable in an alkaline environment consisting of an aluminum layer and a thermoplastic polymer layer consisting essentially of at least one material selected from the group consisting of polylactic acid and a copolymer of lactic acid and another hydroxycarboxylic acid, wherein the polylactic acid and the copolymer of lactic acid and another hydroxycarboxylic acid have a weight average molecular weight of 70,000 or more.

2. The decomposable multilayer composite of claim 1 wherein lactic acid is L-lactic acid, D-lactic acid or a mixture of these lactic acids.

3. The decomposable multilayer composite of claim 1 wherein the other hydroxycarboxylic acid is glycolic acid or 6-hydroxycaproic acid.

4. The decomposable multilayer composite of claim 1 wherein the aluminum layer is aluminum foil.

5. The decomposable multilayer composite of claim 1 wherein the aluminum layer is vapor deposited aluminum on a molded form of the thermoplastic polymer layer.

* * * * *